June 24, 1941.   R. LEE   2,246,803
MOTOR SWITCH PROTECTIVE MEANS
Filed June 15, 1940
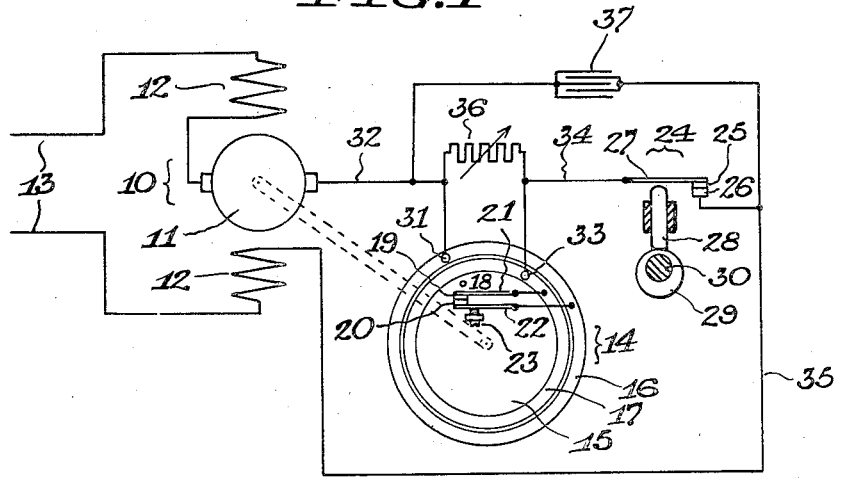
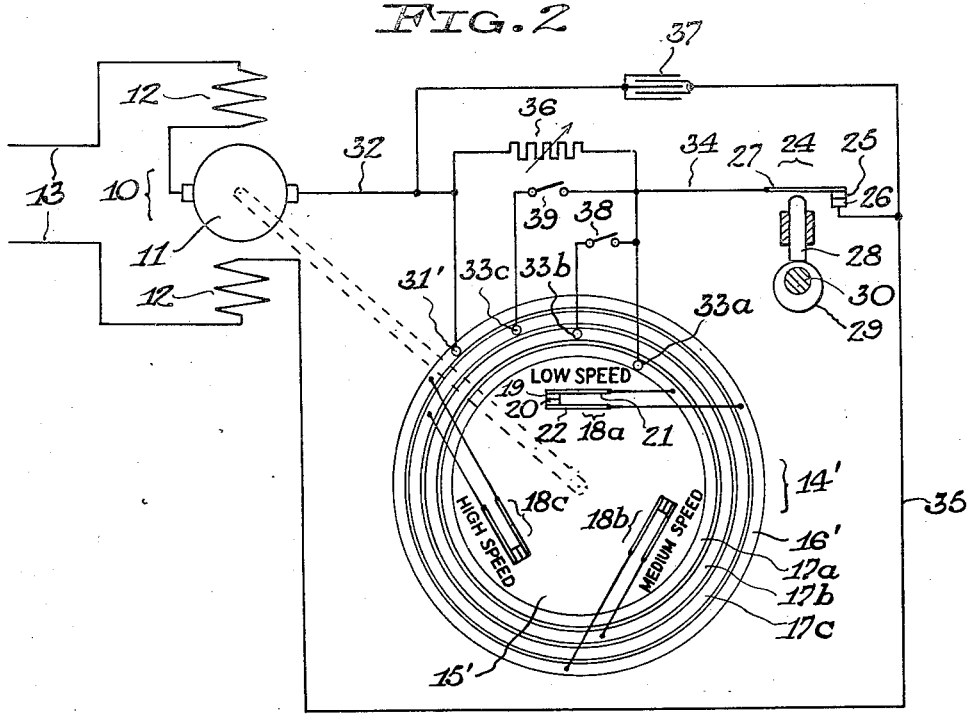
INVENTOR
ROYAL LEE
BY Christopher L. Waal
ATTORNEY Patented June 24, 1941

2,246,803

UNITED STATES PATENT OFFICE 2,246,803

MOTOR SWITCH PROTECTIVE MEANS

Royal Lee, Milwaukee, Wis., assignor to Lee Engineering Research Corporation, Milwaukee, Wis., a corporation of Wisconsin Application June 15, 1940, Serial No. 340,706

4 Claims. (Cl. 171—222)

The present invention relates to switch protective means and to motor control systems embodying the same.

Regulators or governors including speed-responsive switch means with intermittently engageable contacts have been used to a considerable extent with electric motors of small size, particularly those of the series or universal type, for maintaining a constant motor speed. Certain forms of such regulators embodying centrifugal switches are disclosed in my United States Patents 1,630,394 and 1,767,146, issued May 31, 1927, and June 24, 1930, respectively. In some instances, motors equipped with speed regulators are connected in circuit with additional switch means for controlling motor starting and stopping.

An object of the invention is to provide an improved motor control system wherein a speed-responsive switch and a motor starting and stopping switch have their contacts protected by simple but effective spark suppressing means common to both switches, thus avoiding the necessity for separate protective means for these switches.

Another object of the invention is to provide a motor control system of this general type wherein the same spark suppressing means serves to protect the motor starting and stopping switch and a plurality of selectively effective speed-responsive switches.

A further object is to provide a motor control system which will minimize electrical disturbances on the supply conductors.

The invention further consists in the several features hereinafter described and claimed.

In the accompanying drawing, illustrating certain embodiments of the invention,

Fig. 1 is a schematic diagram of a motor control system arranged in accordance with the invention, and Fig. 2 is a schematic diagram of a modified form of motor control system including a plurality of selectively effective speed-responsive switches.

In the drawing, 10 designates an electric motor of the series or universal type having an armature 11 and field windings 12, the motor being adapted for operation on either direct current or alternating current from line conductors or supply mains 13.

In order to maintain a constant motor speed, the motor is provided with a suitable speed regulator, preferably in the form of a centrifugal switch of the general type shown in the above-mentioned Patents 1,630,394 and 1,767,146.

In the form of the invention shown in Fig. 1, the centrifugal switch is designated generally by 14 and includes a rotatable disk 15 driven by the motor and carrying a pair of current collector rings 16 and 17. A centrifugally actuated switch unit 18 is carried by the disk and comprises a pair of relatively movable contacts 19 and 20 arranged in off-center relation to the disk axis, as by means of respective cantilever leaf springs 21 and 22 mounted on the disk and electrically connected to the collector rings 17 and 16, respectively. The contacts are preferably formed of tungsten or other resistant metal. If desired, the speed-setting of the switch may be adjustable as by means of a set-screw 23 for adjusting the flexural stress on the spring 21. In cases where adjustment of the speed-setting is desired while the motor is operating, the adjusting means shown in the above-mentioned Patent 1,767,146 may be used.

Connected in series with the centrifugal switch 14 and motor windings is a control switch 24 for starting and stopping the motor. The control switch includes cooperating contacts 25 and 26 and is preferably of a relatively simple type in which the contact 25 is mounted on a deflectable cantilever leaf spring 27. The control switch may be operated in any suitable manner, as by means of a switch-opening plunger 28 displaceable by a cam 29. The cam is preferably of the rotary type and is here shown to be carried on a rotary shaft 30.

A brush 31 bearing on the collector ring 16 is connected by a conductor 32 to one of the motor armature brushes, and another brush 33 bearing on the collector ring 17 is connected by a conductor 34 to the contact 25 of the control switch 24, the other contact 26 of the control switch being connected by a conductor 35 to one end of one of the field windings 12. The centrifugal switch 14 and control switch 24 are thus connected in series between one of the armature brushes and one end of one of the field windings, thereby placing these switches in series with the motor windings. By this relation the field windings will form choke coils or reactors serving to prevent or minimize the transmission to both line conductors 13 of electrical disturbances caused by the operation of either of the switches.

The contacts of the centrifugal switch are shunted by a resistor 36 which is either adjustable or fixed in value and which carries part of the motor current. In the case of an alternating current motor, the resistor may in some instances be replaced by an equivalent choke coil or reactor. The resistance value of the resistor 36 is not critical, and a suitable value for any particular motor can readily be found by experiment. In general, the resistor may be such as to carry a relatively large part of the motor current, especially when the resistor is used with a motor intended to operate at a single constant speed and at a substantially constant load. In certain cases, however, the resistor may have such a high resistance that it will pass only a small part of the normal motor current.

The motors of certain types of machines, such as power-driven adding machines, are required to start and stop frequently, for example, at intervals of one or two seconds. For this service, it is desirable to provide a relatively simple form of motor control switch, such as that shown in Fig. 1, rather than a quick-action or snap switch, in order to minimize the danger of breakdown. In a machine of this type the switch-operating shaft may be in the form of a suitably actuated cam-shaft which opens and closes the switch at the proper instants. In certain other types of machines, such as kitchen mixers, the rotary switch-controlling cam 29 may form a part of the speed-setting mechanism for the centrifugal switch.

The contacts of the centrifugal switch 14 and control switch 24 are protected by spark suppressing or limiting means comprising a condenser 37 and the resistor 36 cooperating therewith. The terminals of the condenser are connected to the conductors 32 and 35 so that the condenser shunts the portion of the motor circuit including both of the series-connected switches 14 and 24. The electrical connections between the condenser and the switches have a negligible or relatively low inductance. The condenser capacity is not critical and in many instances may have a value ranging from $\frac{1}{16}$ to $\frac{1}{2}$ microfarad.

The motor is started in operation by closing the control switch 24 to admit current to the motor, the motor current flowing through the then closed centrifugal switch contacts 19 and 20. The motor accelerates to a critical speed at which the spring-biased centrifugally actuated contact 19 separates from the contact 20, thus reducing the motor current and causing the motor speed to drop slightly. The contacts then re-engage, causing the motor speed to again increase slightly, and the cycle of operation is repeated. In practice, the contact 19 vibrates at a high frequency, for example, 50 to 300 cycles per second, and the motor speed remains substantially constant. While the centrifugal switch is operating, the condenser 37 is in shunt across the centrifugal switch contacts and resistor 36 by way of the then closed control switch 24. When the centrifugal switch opens, the induced voltage which is developed causes current to flow into the condenser 37 and through the resistor 36, thus limiting the magnitude of this voltage and limiting or preventing sparking or arcing at the brushes and collector rings and at the centrifugal switch contacts, as well as preventing stressing or puncturing of the motor insulation. During the interval in which the centrifugal switch is open the condenser discharges to a somewhat lower terminal voltage through the shunt resistor 36, by way of the then closed control switch 24, so that when the centrifugal switch recloses the discharge current from the condenser is limited to a low value, thus avoiding damage to the brushes and collector rings and to the centrifugal switch contacts and control switch contacts. When the control switch 24 is opened to stop the motor, the condenser is then in shunt across the control switch contacts by way of the momentarily closed contacts of the centrifugal switch 14, and limits or prevents sparking or arcing at the control switch contacts. If the centrifugal switch should be open at the instant the control switch opens, the break voltage will divide between the two switches, modified to some extent by the presence of the resistor 36. Soon after the control switch opens, the voltage on the condenser decreases to approximately the line voltage.

In the modified form of the invention shown in Fig. 2, the motor-driven centrifugal switch is designated generally by 14' and includes a rotatable disk 15' carrying thereon a plurality of switch units 18a, 18b and 18c adapted to operate at different speeds, these switch units being indicated by "low speed," "medium speed," and "high speed," respectively. Each of these switch units is similar to the switch unit 18 of the Fig. 1 device. The contacts 20 of all the switch units are connected to a common collector ring 16' carried on the disk, and the contacts 19 of the switch units are connected to respective collector rings 17a, 17b, and 17c.

A brush 31' bearing on the collector ring 16' is connected by a conductor 32 to one of the motor armature brushes, and another brush 33a bearing on the collector ring 17a is connected by a conductor 34 to the contact 25 of the control switch 24, the other contact 26 of the control switch being connected by a conductor 35 to one end of one of the motor field windings 12. The low speed centrifugal switch unit 18a and control switch 24 are thus connected in series between one of the armature brushes and one end of one of the field windings, thus placing these switches in series with the motor windings.

A brush 33b bears on the collector ring 17b for the medium speed switch unit 18b and is connected to the conductor 34 by a switch 38. Another brush 33c bears on the collector ring 17c for the high speed switch unit 18c and is connected to the conductor 34 by a switch 39. The switches 38 and 39 may be of any suitable type. A resistor 36 and condenser 37 are connected in the circuit in the same manner as in Fig. 1, and are common to all of the centrifugal switch units.

The operation of the system of Fig. 2 is generally similar to that of Fig. 1. When the motor is to be operated at low speed the switches 38 and 39 are left open, whereupon the centrifugal switch unit 18a will control the speed of the motor. For operation of the motor at medium speed, the switch 38 is closed, thus bringing into action the centrifugal switch unit 18b. During operation of the motor at medium speed the contacts of the low speed switch unit 18a remain open. In a similar manner the switch 39 is closed to bring into action the centrifugal switch unit 18c and to thus cause the motor to operate at high speed. The resistor 36 remains shunted across the selectively effective centrifugal switch units. The condenser 37 minimizes sparking at the contacts of the control switch 24 and also at the contacts of each of the selectively effective centrifugal switch units, and the resistor forms a discharge path for the condenser at each of the selected speeds. The condenser further serves to protect the contacts of the speed-selecting switches 38 and 39. In many instances, the latter switches may be of a quick-break type, such as the toggle type, to further prevent deterioration of the contacts.

Certain embodiments of the invention have been shown and described, but it will be obvious to those skilled in the art that modifications may be made without departing from the spirit and scope of the invention.

What I claim as new and desire to secure by Letters Patent is:

1. In combination, an electric motor, a speed regulator for said motor including a switch for opening and closing a circuit of the motor, a resistor connected in shunt with said speed regulator switch, a control switch connected in series with said speed regulator switch to start and stop the motor, and a condenser connected in shunt with the portion of said circuit including both of said switches to limit sparking at the contacts of said switches when either of said switches is opened, the electrical connections between said condenser and said switches having a relatively low inductance, and said resistor forming a discharge path for said condenser by way of said control switch.

2. In combination, a work circuit, a centrifugal switch in said circuit, a resistor connected in shunt with said centrifugal switch, a control switch in said circuit in series with said centrifugal switch, and a condenser connected in shunt with the portion of said circuit including both of said switches to limit sparking at the contacts of said switches when either of said switches is opened, the electrical connections between said condenser and said switches having a relatively low inductance.

3. In combination, an electric motor, a speed-responsive switch for opening and closing a circuit of the motor to regulate the motor speed, a control switch to start and stop the motor and connected in said circuit in series with said speed-responsive switch, and spark-suppressing means for said switches comprising a condenser connected in shunt with the portion of the circuit including both of said switches and further comprising a resistor having a shunt connection with said condenser, the electrical connections between said condenser and said switches having a relatively low inductance.

4. In combination, an electric motor adapted to be connected to supply conductors and having windings connected in series, a speed-responsive switch for said motor connected in series with said windings at a point between said windings, a control switch to start and stop the motor connected in series with said speed-responsive switch at a point between said windings, said windings forming choke coils to minimize electrical disturbances on the supply conductors incident to the operation of either of said switches, and spark-suppressing means for said switches comprising a condenser connected in shunt with the portion of the circuit between said windings and including both of said switches and further comprising a resistor having a shunt connection with said condenser to form a discharge path for said condenser, the electrical connections between said condenser and said switches having a relatively low inductance.

ROYAL LEE.